United States Patent Office 3,364,247
Patented Jan. 16, 1968

3,364,247
BUNTE COMPOUNDS
Morton H. Gollis, Brookline, Mass., assignor to Monsanto Research Corporation, St. Louis, Mo., a corporation of Delaware
No Drawing. Filed Oct. 27, 1964, Ser. No. 406,905
24 Claims. (Cl. 260—453)

This invention relates to new Bunte compounds, and more particularly, provides novel substituted-alkylaminoalkylthiosulfuric acid compounds, and methods of making the same.

The compounds known as Bunte salts are alkylthiosulfuric acid salts represented by the formula $RSSO_3M'$, where R is a hydrocarbon radical such as an alkyl or aralkyl hydrocarbon radical and M' is a cation such as $Na^+$. The acids, $RSSO_3H$, corresponding to these salts are generally unstable in aqueous solution.

Derivatives of these salts and acids may be called Bunte compounds. For example, when an amino group is introduced onto the R radical of the above formula, producing compounds of the formula

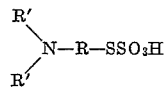

where each R' is H or an alkyl or aralkyl hydrocarbon radical and R is as defined above, the resulting free acids are stable even in boiling water. This stability is attributed to the formation of an inner salt.

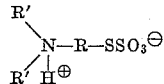

like the inner salts (zwitterions) formed by aminoalkanecarboxylic acids. These stable thiosulfuric acid compounds may be called inner Bunte salts.

It is an object of this invention to provide novel compounds.

A particular object of this invention is to provide novel alkylaminoalkylthiosulfuric acid compounds in which the alkylamino radical is substituted by certain functional groups.

These and other objects will become evident from a consideration of the following specification and claims.

The compounds provided by this invention are alkylaminoalkylthiosulfuric acid salts in which the alkyl radical of the alkylamino group has a substituent selected from the class consisting of hydroxy, alkylamino and oxyalkylamino groups; and amide derivaties and acid addition salts thereof.

The substituted-alkyl aminoalkyl thiouslfuric acid compounds of this invention are amines and amides of the formula

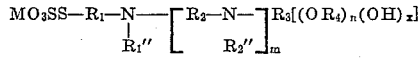

in which $m$ and $n$ are integers selected from 0 and 1,
$x$ is an integer of from 0 to 6 when m is 1, and from 1 to 6 when $m$ is 0,
M is a cation selected from the class consisting of H and alkali metals,
each R" is selected from the class consisting of H, saturated aliphatic hydrocarbon radicals, and alkanoyl radicals of the formula

and
each R is a saturated aliphatic hydrocarbon radical.

By "each" R is meant each of $R_1$, $R_2$, $R_3$, $R_4$ and $R_5$, and by "each" R" is meant each of $R''_1$ and $R''_2$. The term, substituted-alkyl aminoalkyl thiosulfuric acid compounds, is used herein to designate both the amines and the amides of this invention. When reference is made herein to the "amides," or the "diamines," or the "alkylamino salts" of the invention, and so forth, the present amine compounds other than the amides are meant.

The invention includes a number of different types of substituted-alkl aminoalkyl thiosulfuric acid compounds, a comprehension of which will be facilitated by consideration of the specific clases included herein as follows.

Of the amines of the invention, a first class of compounds provided hereby are mono-amines of the formula

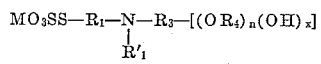

where each R is saturated aliphatic hydrocarbon,
$R'_1$ is selected from H and saturated aliphatic hydrocarbon,
M is a cation selected from the class consisting of H and alkali metals,
$n$ is an integer of from 0 to 1, and
$x$ is an integer of from 1 to 6.

By "each" R is meant each of $R_1$, $R_3$ and $R_4$.

If $n$ is 0 these are alkanols. Embodiments of the invention include secondary and tertiary amino monoalkanols and polyalkanols as pointed out hereinafter, such as $$HO_3SS-CH_2-CH_2-NHCH_1CH_2OH$$

and

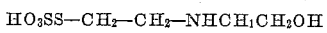

When $n$ is greater than 0, the embodiment of the invention is an alkoxyalkanol which may have the OH groups attached to either or both of the alkyl radicals linked to the ether oxygen, such as

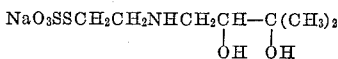

An embodiment of the invention included in the above-stated groups comprises alicyclic compounds, such as

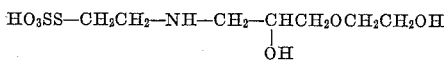

A further embodiment of this invention comprises heterocyclic alcohols and ethers, where two of the radicals symbolized by $R'_1$, $R_3$ and $R_4$ are aliphatic hydrocarbon forming part of the same chain. These alcohols and ethers may be azacyclic, such as

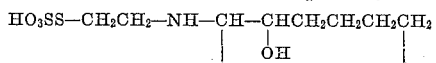

or oxacyclic such as

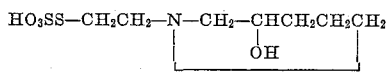

A second class of amines provided by this invention comprises diamines.

In a first embodiment of this class, the said diamines are alkylenediamines in which a residual valence bond of one of the amine N atoms is attached to an alkylthiosulfuric acid radical, and a residual valence bond of the other N atom is attached to a saturated aliphatic hydrocarbon radical. These are represented by the formula

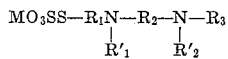

where each R is saturated aliphatic hydrocarbon, each R' is selected from H and saturated aliphatic hydrocarbon, and
M is selected from H and alkali metals where "each R means each of $R_1$, $R_2$, and $R_3$, and "each" R', each of $R'_1$ and $R'_2$.

Illustrative of this embodiment of the diamines of the invention is a compound of the formula

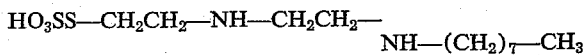
$$NH—(CH_2)_7—CH_3$$

In a second embodiment of the class of diamines of this invention, the diamines are alkylenediamines in which one of the amino N atoms is attached to an alkylthiosulfuric acid radical, the other of the N atoms is attached to an oxyalkyl radical, and all the other nitrogen substituents are selected from H and saturated aliphatic hydrocarbon radicals. These are represented by the formula

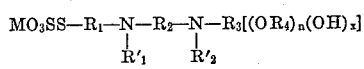

where each R is saturated aliphatic hydrocarbon,
each R' is selected from H and saturated aliphatic hydrocarbon,
M is selected from H and alkali metals,
$n$ is an integer of from 0 to 1,
$x$ is an integer of from 0 to 6,
and at least one of $n$ and $x$ is at least 1.

This class of oxyalkyl diamines includes alkanols and alkoxyalkyl compounds. Illustrative of such alkanols are the diamines of the above formula which are hydroxy-substituted, such as

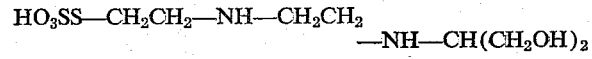
$$—NH—CH(CH_2OH)_2$$

The embodiment of these diamines where an alkoxyalkyl radical is attached to one N and the alkylthiosulfuric radical to the other may be illustrated by an ether such as

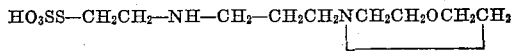

From the foregoing it will be evident that the present amines can be generally described as substituted-alkyl aminoalkyl thiosulfuric acids and salts containing a hydroxy group or an alkylamino radical as the substituted-alkyl radical substituent, in which all the N substituents are selected from the class consisting of H, saturated aliphatic hydrocarbon, oxyalkyl and alkylthiosulfuric acid radicals where alkyl is saturated aliphatic hydrocarbon. Oxy designates connective oxygen, joining C to H or forming the sole bond between two C atoms: the presently provided amines are completely saturated, and free of C—O and C—N unsaturation as well as of carbon-to-carbon unsaturation. Further characterizing the amines of this invention is the fact that the nitrogen atoms thereof are at least two carbon atoms removed from hetero atoms (atoms other than C, including O and S). The compounds in which the nitrogen atom is beta to each of a sulfur-substituted carbon atom and an oxygen- or nitrogen-substituted carbon atom are especially preferred. A particularly preferred class of the present amines comprises the compounds in which the N atoms are hydrogen-substituted (secondary amines).

As noted above, this invention also provides amides of the stated amines. This includes amides of one or both of the two amino N atoms, where two are present. The amides included are those of these amines with alkanoic acids, that is, acids consisting of a saturated aliphatic hydrocarbon radical attached to the carboxylic function. These amides are represented by the formula

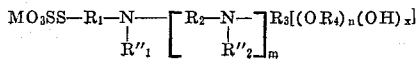

where
each R" is selected from the class consisting of H, saturated aliphatic hydrocarbon radicals and acyl radicals of the formula

each R is saturated aliphatic hydrocarbon,
M is a cation selected from H and alkali metals,
$x$ is an integer of from 0 to 6 when $m=1$, and from 1 to 6 when $m=0$,
$m$ and $n$ are integers of from 0 to 1 and at least one of $R''_1$ and $R''_2$ is an alkanoyl radical of the formula

This embodiment of the invention is illustrated, for example, by an N-(hydroxyalkyl)alkanamido alkylthiosulfuric acid salt such as

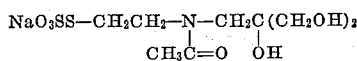

Each of the saturated aliphatic hydrocarbon radicals of the amines and their amides of this invention is hydrocarbon of up to 18 carbon atoms.

The presently provided diamines containing two amino N atoms form acid addition salts, and these are also provided by this invention. As will appear hereinafter, inorganic or organic protonic acids may be used to form these addition salts. Physiologically acceptable salts of the amines with nontoxic acids, such as the hydrochlorides, are preferred. The presently provided compounds are useful as pharmaceuticals; they are antiradiation drugs which protect animals against the lethal and toxic effects of ionizing radiation.

EXEMPLARY COMPOUNDS

Referring now to the scope of this invention, illustrative substituted-alkyl aminoalkyl thiosulfuric acid compounds within the scope of the invention are listed below. It is to be understood that the invention also includes the corresponding alkali metal salts, e.g., the salts with lithium, sodium and potassium (atomic weight below 40), and also the diamine acid addition salts, e.g., the hydrochloride, tartrate, maleate, and so forth. It is further to be understood that, while named as acids, the aminoalkyl thiosulfuric acids will usually exist as inner salts: for example, the acid of structure $$HO_3SS—CH_2CH_2—NH—CH_2CH_2OH$$

will exist as the zwitterion (inner salt)

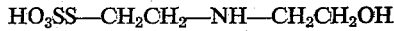

It is also to be understood that where applicable, the various possible optical isomers and their racemates are included.

Mono-amines

The mono-amines provided hereby include mono-oxy and poly-oxy compounds composing the sub-classes of alkanols and alkoxyalkanols.

The alkanols which are monohydric and acyclic are illustrated by monoamines including secondary amines such as S-[2-(2-hydroxyethylamino)ethyl]thiosulfuric acid,
S-[2-(2-hydroxyethylamino)propyl]thiosulfuric acid,
S-[2-(2-hydroxy-1-methylethylamino)ethyl]thiosulfuric acid,
S-[2-(3-hydroxypropylamino)ethyl]thiosulfuric acid,
S-[2-(4-hydroxybutylamino)ethyl]thiosulfuric acid,
S-[2-(3-hydroxy-1-methylpropylamino)ethyl]thiosulfuric acid,
S-[2-(2-hydroxypropylamino)ethyl]thiosulfuric acid,
S-[3-(3-hydroxypropylamino)propyl]thiosulfuric acid, S-(1-[(2-hydroxybutylamino)methyl]nonyl)thiosulfuric acid,
S-[3-(2-hydroxybutylamino)propyl]thiosulfuric acid,
S-[2-(2-hydroxyoctylamino)ethyl]thiosulfuric acid,
S-[2-(2-hydroxy-1-methylpentadecylamino)ethyl]thiosulfuric acid,
S-[2-(2-hydroxy-2-methylpropylamino)ethyl]thiosulfuric acid,
S-[2-(2-hydroxy-2-methylpentylamino)ethyl]thiosulfuric acid, and tertiary amines such as S-(2-[(2-hydroxyethyl)methylamino]ethyl)thiosulfuric acid,
S-(3-[(2-hydroxyethyl)methylamino]propyl)thiosulfuric acid,
S-(2-[(2-hydroxyethyl)nonylamino]ethyl)thiosulfuric acid,
S-(2-[(2-hydroxyethyl)isopropylamino]ethyl)thiosulfuric acid,
S-(2-[(2-hydroxyethyl)butylamino]ethyl)thiosulfuric acid and the like.

The alcohols which are monohydric and cyclic are illustrated by alicyclic mono-amines such as
S-[2-(2-hydroxycyclohexylamino)ethyl]thiosulfuric acid,
S-(2-[(2-hydroxycyclohexyl)methylamino]ethyl)thiosulfuric acid,
S-[2-(4-ethyl-2-hydroxycyclopentylamino)ethyl]thiosulfuric acid,
and by heterocyclic mono-amines such as
S-[2-(3-hydroxypiperidino)ethyl]thiosulfuric acid,
S-[2-(1-hydroxypiperidino)ethyl]thiosulfuric acid,
S-(2-[(3-hydroxymethyl)piperidino]ethyl)thiosulfuric acid,
and so forth.

Still another class of mono-amines provided by this invention are poly-oxy compounds, containing more than one connective oxygen atom.

This class is inclusive, firstly, of poly-oxy compounds comprising polyols. Illustrative polyols of this nature, comprising poly-hydroxyalkyl aminoalkyl thiosulfuric acids, include
S-[2-(2,3-dihydroxypropylamino)ethyl]thiosulfuric acid,
S-[2-(2,3-dihydroxy-1-methylpropylamino)ethyl]thiosulfuric acid,
S-(2-[2-hydroxy-1-(hydroxymethyl)ethylaminor]ethyl)thiosulfuric acid,
S-(2-[2-hydroxy-1-(hydroxymethyl)propylamino]ethyl)thiosulfuric acid,
S-[4-(2,3-dihydroxypropylamino)butyl]thiosulfuric acid,
S-[2-(2,4-dihydroxybutylamino)ethyl]thiosulfuric acid,
S-(3-[3-hydroxy-1-(hydroxymethyl)-2-methylpropylamino]propyl)thiosulfuric acid,
S-(2-[1-(1,2-dihydroxyethyl)hexadecylamino]ethyl)thiosulfuric acid,
S-[2-(3,4-dihydroxycyclohexylamino)ethyl]thiosulfuric acid,
S-(2-[(2,3-dihydroxypropyl)methylamino]ethyl)thiosulfuric acid,
S-(2-[2-hydroxy-1,1-bis(hydroxymethyl)ethylamino]ethyl)thiosulfuric acid,
S-(2-[2-hydroxy-1-(hydroxymethyl)ethylamino]ethyl)thiosulfuric acid,
S-(2-[2,3-dihydroxy-2-(hydroxymethyl)propylamino]ethyl)thiosulfuric acid,
S-(3-[3-hydroxy-1,1-bis(2-hydroxyethyl)propylamino]propyl)thiosulfuric acid,
S-(2-[3,4-dihydroxy-2,2-bis(hydroxymethyl)butylamino]ethyl)thiosulfuric acid,
S-(2-[2,3,4-trihydroxy-2-(hydroxymethyl)butylamino]decyl)thiosulfuric acid,
S-(2-[3,4-dihydroxy-2,2-bis(2-hydroxyethyl)butylamino]ethyl)thiosulfuric acid,
S-(2-[3,4-dihydroxy-2,2-bis(hydroxymethyl)butylamino]ethyl)thiosulfuric acid,
S-(2-[2,4-dihydroxy-3,3-bis(hydroxyethyl)butylamino]propyl)thiosulfuric acid,
S-(2-[2,5-dihydroxy-3,3-bis(2-hydroxyethyl)pentylamino]octyl)thiosulfuric acid,
S-(2-[3-hydroxy-2-(hydroxymethyl)-1-(hydroxy-1-[hydroxymethyl]ethyl)propylamino]ethyl)thiosulfuric acid,
S-(3-[3-hydroxy-1-(2-hydroxyethyl)-2,2-bis(hydroxymethyl)propylamino]propyl)thiosulfuric acid,
S-[2-(2,3,4,5,6-pentahydroxyhexylamino)ethyl]thiosulfuric acid,
S-(2-[2,3,4-trihydroxy-2-(1,2-dihydroxyethyl)butylamino]thiosulfuric acid,
S-(2-[2,3-dihydroxy-1-(1,2-dihydroxyethyl)-2-(hydroxymethyl)propylamino]ethyl)thiosulfuric acid,
S-(2-[2,3,4,5,6-pentahydroxy-2-(hydroxymethyl)hexylamino]ethyl) thiosulfuric acid and the like.

The mono-amino poly-oxy compounds of the invention also include alkoxyalkanols such as
S-(2-[2-(2-hydroxyethoxy)ethylamino]ethyl)thiosulfuric acid,
S-[2-(2-hydroxy-3-methoxypropylamino)ethyl]thiosulfuric acid,
S-[3-(2-hydroxy-3-butoxypropylamino)propyl]thiosulfuric acid,
S-[2-(2-hydroxy-3-pentoxypropylamino)ethyl]thiosulfuric acid,
S-(2-[(2-hydroxy-2-cyclohexyloxypropyl)ethylamino]ethyl)thiosulfuric acid,
S-[2-(4-hydroxy-5-methoxy-2-methylpropylamino)ethyl]thiosulfuric acid,
S-(2-[(1,2,3,4,5,6-hexahydroxycyclohexylmethyl)amino]ethyl)thiosulfuric acid,
S-[2-(3-hydroxy-4-pyranylmethylamino)ethyl]thiosulfuric acid,
S-(2-[2-hydroxy-2-(2-hydroxyethoxy)ethylamino]ethyl)thiosulfuric acid,
S-(2-[2-hydroxy-2-(2,3-dihydroxypropoxy)ethylamino]propyl)-thiosulfuric acid,
S-(2-[2-hydroxy-3-(3-hydroxy-2,2-bis[hydroxymethyl]propoxy)propylamino]propyl)-thiosulfuric acid,
S-(2-[2-hydroxy-3-(3-hydroxy-2,2-bis[hydroxymethyl]propoxy)-propylamino]ethyl)thiosulfuric acid,
S-(2-[2-hydroxy-3-(3-hydroxy-1,1,2-tris[hydroxymethyl]propoxy)propylamino]ethyl)thiosulfuric acid,
and the like.

*Diamines*

The diamines of the invention which are alkylaminoalkyl aminoalkyl thiosulfuric acids are exemplified by compounds such as S-(2-[2-(methylamino)ethylamino]ethyl)thiosulfuric acid,
S-(2-[2-(ethylamino)ethylamino]ethyl)thiosulfuric acid,
S-(2-[2-(ethylamino)ethylamino]propyl)thiosulfuric acid,
S-(2-[2-(butylamino)propylamino]ethyl)thiosulfuric acid,
S-(3-[2-(butylamino)ethylamino]propyl)thiosulfuric acid,
S-(2-[2-(octylamino)ethylamino]ethyl)thiosulfuric acid,
S-(2-[2-(nonylamino)dodecylamino]ethyl)thiosulfuric acid,
S-(2-[2-(decylamino)ethylamino]ethyl)thiosulfuric acid,
S-(2-[2-(decylamino)ethylamino]decyl)thiosulfuric acid,
S-(2-[2-decylamino)octadecylamino]ethyl)thiosulfuric acid,
S-(2-[2-(dodecylamino)ethylamino]ethyl)thiosulfuric acid,
S-(2-[2-(octadecylamino)ethylamino]ethyl)thiosulfuric acid, and the like. Of this class, those with a higher alkyl substituent, of from 7 to 18 carbon atoms, as the terminal alkyl substituent are preferred.

The diamines of the invention which are oxyalkyl aminoalkyl aminoalkyl thiosulfuric acids are illustrated by [(mono- and [(poly-hydroxyalkylamino)alkyl] aminoalkyl thiosulfuric acids such as S-[2-(2-[2-hydroxyethyl)amino]ethylamino)ethyl]thiosulfuric acid,
S-[2-(2-[(2-hydroxypropyl)amino]ethylamino)ethyl] thiosulfuric acid,
S-[2-(2-[(2-hydroxyethyl)amino]ethylamino)propyl] thiosulfuric acid,
S-[3-(2-[(2-hydroxyethyl)amino]ethylamino)propyl] thiosulfuric acid,
S-[2-(2-[(3-hydroxypropyl)amino]ethylamino)ethyl] thiosulfuric acid,
S-[3-(3-[(3-hydroxypropyl)amino]propylamino)propyl] thiosulfuric acid,
S-[2-(2-[(2-hydroxy-1-methylpropyl)amino]ethylamino) ethyl]thiosulfuric acid,
S-[2-(2-[(2-hydroxy-1-methylpropyl)amino]-1-methylpropylamino)ethyl]thiosulfuric acid,
S-[2-(2-[(2-hydroxycyclohexyl)amino]ethylamino) ethyl]thiosulfuric acid,
S-(2-[2-(6-hydroxyhexylamino)ethylamino]ethyl)thiosulfuric acid,
S-[2-(2-[(2-hydroxy-1-[hydroxymethyl]ethyl)amino] ethylamino)butyl]thiosulfuric acid,
S-(2-[2-(2,3-dihydroxypropylamino)ethylamino]ethyl) thiosulfuric acid,
S-[2-(2-[(2,3,4-trihydroxybutyl)amino]dodecylamino) ethyl]thiosulfuric acid,
S-[2-(2-[(1,1-bis(hydroxymethyl)-3,4-dihydroxybutyl) amino]ethylamino)ethyl]thiosulfuric acid,
S-[3-(2,3,4,5,6-pentahydroxy-2-[hydroxymethyl]hexylamino)ethylamino]propyl]thiosulfuric acid,
and the like, and

[(oxyalkyl)amino]alkylaminoalkylthiosulfuric acids such as

S-[2-(2-[2-(2-hydroxyethoxy)ethylamino]ethylamino) ethyl)thiosulfuric acid,
S-[2-(2-[(2-hydroxy-3-[2-hydroxyethoxy]propyl)amino] ethylamino)ethyl]thiosulfuric acid,
S-[4-(2-[(3-hydroxy-2,2-bis[2-hydroxyethoxy]propyl) amino]ethylamino)butyl]thiosulfuric acid,
S-[2-(2-[(2-hydroxy-3-[2,3-dihydroxypropoxy]propyl) amino]ethylamino)ethyl]thiosulfuric acid,
S-[3-(2-[(2-hydroxy-3-[2-hydroxyethoxy]propyl)amino] propylamino)propyl]thiosulfuric acid,
S-[2-(2-[2-(2,3,4,5,6-pentahydroxyoctoxy)ethylamino] ethylamino)ethyl]thiosulfuric acid,
S-[2-(2-[(2-hydroxy-3-[2-hydroxyethoxy]propyl)amino] nonylamino)ethyl]thiosulfuric acid,
S-[2-(2-[2,3-dimethoxypropylamino]ethylamino)ethyl] thiosulfuric acid,
and so forth.

The amides

Still another class of novel compounds provided by the invention are amides of the aminoalkylthiosulfuric acids of the invention. Thus, for example, the invention includes mono-amides such as S-(2-[N-(2-hydroxyethyl)-acetamido]ethyl)thiosulfuric acid,
S-(3-[N-(2,3-dihydroxypropyl)acetamido]propyl) thiosulfuric acid,
S-(2-[N-(2,3-dihydroxy-2[hydroxymethyl]propyl) acetamido]ethyl)thiosulfuric acid,
S-(2-[N-(2-hydroxyethyl)butyramido]ethyl)thiosulfuric acid,
S-(2-[N-(2,3-dihydroxy-1,2-bis[hydroxymethyl]propyl) octanamido]ethyl)thiosulfuric acid,
S-(2-[N-(1,2,3,4,5,6-hexahydroxycyclohexylmethyl)acetamido]ethyl)thiosulfuric acid,
S-(2-[N-(2,3-dihydroxypropyl)propionamido]octadecyl) thiosulfuric acid;

di-amides of alkylaminoalkyl aminoalkyl thiosulfuric acids such as

S-(2-[N-(2-[N'-hexylacetamido]ethyl)acetamido]ethyl) thiosulfuric acid,
S-(2-[N-(2-[N'-octylacetamido]propyl)butyramido] propyl)thiosulfuric acid,
S-(2-[N-(2-[N'-decylpropionamido]ethyl)octanamido] ethyl)thiosulfuric acid,
S-(2-[N-(2-[N'-decylacetamido]ethylacetamido]ethyl) thiosulfuric acid,
S-(2-[N-(2-[N'-dodecyloctanamido]ethyl)octanamido] dodecyl)thiosulfuric acid,
S-(2-[N-(2-[N'-octadecylacetamido]hexyl)acetamido] ethyl)thiosulfuric acid;

amino amides such as

S-[2-(N-[2-(2-hydroxyethylamino)ethyl]acetamido) ethyl]thiosulfuric acid,
S-[2-(N-[2-(2,3-dihydroxypropylamino)ethyl]acetamido)ethyl]thiosulfuric acid,
S-[3-(N-[2-(3-hydroxypropylamino)ethyl]butyramido) propyl]thiosulfuric acid,
S-[2-(N-[2-(2-hydroxy-1,1-bis[hydroxymethyl]ethylamino)butyl]acetamido)ethyl]thiosulfuric acid
S-[2-(2-[N-(2-hydroxyethyl)acetamido]ethylamino) ethyl]thiosulfuric acid,
S-[2-(2-[N-(2-hydroxy-3-[1,2-dihydroxyethyl]butyl) acetamido]ethylamino)ethyl]thiosulfuric acid,
S-[2-(2-[N-(2-methoxy-1-hydroxyethyl)hexanamido] propylamino)butyl]thiosulfuric acid,
S-[2-(2-[N-(6-hydroxyhexyl)acetamido]ethylamino) ethyl]thiosulfuric acid,
S-[2-(2-[N-(2,3-dihydroxypropyl)propionamido]ethylamino)ethyl]thiosulfuric acid;

and diamides of hydroxyalkyl aminoalkyl aminoalkyl thiosulfuric acids such as

S-[2-(N-[2-(N-[2-hydroxyethyl]acetamido)ethyl]acetamido)ethyl]thiosulfuric acid,
S-[2-(N-[2-(N-[1-(hydroxymethoxy)ethyl]acetamido) butyl]acetamido)propyl]thiosulfuric acid,
S-[2-(N-[2-(N-[2,3-dihydroxybutyl]acetamido)propyl] acetamido)ethyl]thiosulfuric acid,
and the like.

Methods of preparation

These are two general types of synthetic methods particularly useful for producing the substituted-alkylamino acids and salts of the invention. The first is reaction of an aminoalkylthiosulfuric acid salt with an epoxide. The second is reaction of a substituted-alkylaminoalkyl disulfide with a bisulfite salt.

Aminoalkylthiosulfuric reaction

Ring opening of ethylene oxide or a like alkylene oxide may be used to introduce a hydroxyalkyl radical onto the N atom of aminoalkylthiosulfuric acid salts to provide the hydroxy-alkylamino salts of the invention. This reaction is illustrated by the equation $$MO_3SS-R_1-NHR'_1 + H_2C\underset{O}{\overset{}{\diagdown\diagup}}C-H_2 \longrightarrow$$

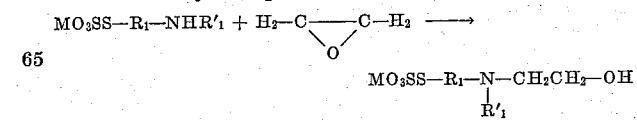

where each R, each R' and M are as identified hereinabove. For convenience, this reaction is illustrated by the reaction with ethylene oxide; however, the C atoms of the epoxide ring system can also be substituted, the reaction proceeding similarly. When substituents are present, the epoxide ring generally opens at the least substituted C atom.

The aminoalkylthiosulfuric acid salts with which the epoxy compounds may be reacted in making the presently provided amines are aminoalkylthiosulfuric acid salts wherein alkyl is saturated aliphatic hydrocarbon, the amino N atom carries at least one H substituent, and the other N substituent is H or saturated aliphatic hydrocarbon. They will be compounds containing the residue of the desired product, to which addition of the hydroxyalkyl radical as an amino N substituent produces the amines of the invention. The alkali metal salts such as the Na, Li and K salts are usually preferably reactants. Illustrative of these salts are, for example, sodium S-2-aminoethylthiosulfate, sodium S-2-aminopropylthiosulfate, potassium S-3-aminopropylthiosulfate, sodium S-2-aminobutylthiosulfate, lithium S-2-aminohexylthiosulfate, sodium S-(2-amino-1-methylpropyl)thiosulfate, sodium S-(2-amino-3-ethylbutyl)thiosulfate, potassium S-2-aminodecylthiosulfate, potassium S-12-aminododecylthiosulfate, sodium S-2-aminooctadecylthiosulfate, sodium S-(2-methylaminoethyl)thiosulfate, sodium S-(2-ethylaminoethyl) thiosulfate, lithium S-(3-methylaminopropyl)thiosulfate, potassium S-(4-aminocyclohexyl)thiosulfate, sodium S-(2-aminododecyl)thiosulfate, sodium S-(3-aminononyl) thiosulfate, potassium S-(3-isopropylamino-2,5-dimethylhexyl)thiosulfate and the like.

The presently useful epoxyalkanes are vic-epoxyalkanes, where the epoxy oxygen is attached to each of two adjacent C atoms. As mentioned above, these C atoms may have H substituents or may have other substituents adapted to produce radicals of the formula $$-R_3[(OR_4)_n(OH)_x]$$

where each R is as defined above, $n$ is 0 or 1, and $x$ is 1 to 6. These substituents may be alkyl, alkyloxy, hydroxyalkyl or combinations thereof, and one or more than one such substituents may be present. As will appear hereinafter, hydroxy groups on epoxides may sometimes advantageously be temporarily blocked, by substitution of an alkanoyl group (corresponding to R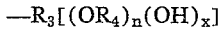CO— as defined above) for the H of OH, and alkylcarbonyloxy groups are thus also presently contemplated epoxide substituents. In general, suitable epoxides are known or may be produced by known procedures, such as the reaction of a S ylide or diazomethane with appropriate ketones. Polyols of the present invention can be produced, for example, by employing an epoxyalkanol such as glycidol, and alkoxyalkanols, by employing an alkoxy epoxy alkane such as 3-methoxy-1,2-propylene oxide as the reactant, and so forth.

Thus, exemplary of presently useful epoxides are vic-epoxyalkanes such as ethylene oxide, 1,2-propylene oxide, 1,2-butylene oxide, 2,3-butylene oxide, 2-methylpropylene oxide, 2-methyl-1,2-pentylene oxide, cyclohexene oxide, 2,3-epoxy-1-propanol, 3,4-epoxy-1-butanol, 3,4-epoxy-2-methyl-2-butanol, 2,3-epoxy-1,4-butanediol, 2,3-epoxy-2-(hydroxymethyl) - 1 - propanol, 2-(hydroxymethyl)-2,3-epoxy-1-propanol diacetate, 5-methyl-5,6-epoxy-1,2,3,4-hexanetetrol tetraacetate, 5-(hydroxymethyl)-5,6-epoxy-1,2,3,4-hexanetetrol pentaacetate, 2,3-epoxypropyl n-butyl ether, 2,3-epoxypropyl 2-methylbutyl ether, 2,3-epoxycyclohexyl methyl ether, 2-(2,3-epoxypropoxy)ethanol, and so forth.

The conditions for conducting the reaction may consist merely of contacting the epoxide with the aminoalkylthiosulfuric acid salt. The temperature may range from above freezing to below the decomposition temperature of the reaction mixture components, broadly; more particularly, about 50–100° C. is usually favorable. The reaction may be exothermic, and gradual addition of the cyclic epoxide to the reaction mixture is usually preferable. Generally, not more than about one mole of the cyclic epoxide will be introduced per mole of the aminoalkylthiosulfuric acid salt, and less may be used where incomplete conversion is acceptable. Solvents and diluents are desirable, and useful solvents and diluents include, for example, hydrocarbons such as benzene and hexane; ethers such as diethyl ether and dioxane; alcohols such as methanol and ethanol, and so forth. Maintaining an atmosphere of nitrogen over the reaction mixture is useful in preventing access of air. Atmospheric pressures are suitable, though variation of pressure above and below atmospheric may be empolyed if desired. The products, which are the N-substituted derivatives of the original aminoalkyl thiosulfuric acid salts, are recovered from the reaction mixture by usual means, such as distillation, extraction or the like; their purification can be accomplished as set forth hereinafter.

Bisulfite reaction

The above-mentioned reaction of a substituted-alkyl-aminoalkyl disulfide with a bisulfite salt is illustrated by the equation

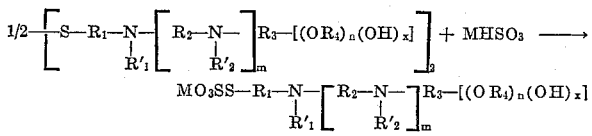

where $m$, $n$, $x$, each R, each R' and M are as defined above.

The stated disulfides are prepared, as is known in the art, by oxidation of the corresponding mercaptans, using $H_2O_2$ as oxidant, for example. The hydroxyalkylaminoalkyl mercaptans (including oxyalkyl aminoalkyl aminoalkyl mercaptans) from which the above sulfides can be prepared by such oxidation are available as described in patent application Ser. No. 176,409, filed by John C. James et al. on Feb. 28, 1962, assigned to the same assignee as the present invention. The mercaptoalkyl diamines from which the di-sulfides can be prepared similarly are known compounds available, for example, by reaction of a 1,2-alkylene sulfide with an alkylene diamine. Also, suitable substituted-alkyl aminoalkyl mercaptan precursors to disulfides may be produced by reacting 1-(benzylthioalkyl)aziridines such as 1-(2-benzylthioethyl)aziridine with aminoalkyl and oxyalkyl amines using $NH_4Cl$ catalyst, to provide diamine compounds which are cleaved to the mercaptan by treatment with liquid ammonia.

The presently useful disulfides may be named as "dithiobis-" compounds: for example, the disulfide of the formula

may be named as 2,2'-[dithiobis(ethyleneimino)]diethanol. However, in the case of these dimeric compounds, it is frequently convenient to use the oxa-aza-thia nomenclature system, in which the above compound—which, with its formula written out in full, is

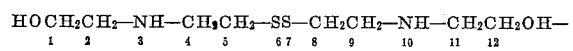

is named 3,10-diaza-6,7-dithiadodecan-1,12-diol.

Thus, presently useful disulfides include, for example, alkanols such as 3,10-diaza-6,7-dithiadodecan-1,12-diol,
4,11-diaza-7,8-dithiatetradecan-1,14-diol,
3,12-diaza-7,8-dithiadodecan-1,14-diol,
4,13-diaza-8,9-dithiahexadecan-1,16-diol,
4,11-diaza-7,8-diaza-7,8-dithiatetradecan-2,13-diol,
4,11-diaza-7,8-dithiatetradecan-1,2,13,14-tetraol,4,11-diaza-7,8-dithia-2,13-bis(hydroxymethyl)tetradecan-1,2,13,14-tetraol,
5,12-diaza-8,9-dithiahexadecan-1,2,3,14,15,16-hexaol,
5,12-diaza-8,9-dithia-6,11-dibutylhexadecan-1,2,3,14,15,16-hexaol,
6,13-diaza-3,16-dioxa-9,10-dithiaoctadecan-1,2,4,15,17,18-hexaol,
4,11-diaza-7,8-dithia-3,12-dimethyltetradecan-2,13-diol,
4,11-diaza-7,8-dithia-2,2,13,13-tetramethyltetradecan-1,14-diol,
3,10-diaza-6,7-dithia-3,10-dimethyldodecan-1,12-diol,
3,10-diaza-6,7-dithia-3,10-diethyldodecan-1,12-diol, and so forth; diamines such as 2,5,12,15-tetraaza-8,9-dithiahexadecane, 3,6,13,16-tetraaza-9,10-dithiaoctadecane,
2,6,13,17-tetraaza-9,10-dithiaoctadecane,
3,6,15,18-tetraaza-10,11-dithiaeicontane,
4,7,14,17-tetraaza-10,11-dithiaeicontane,
6,9,16,19-tetraaza-12,13-dithiatetracosane,
7,10,17,20-tetraaza-13,14-dithiahexacosane,
9,12,19,22-tetraaza-15,16-triacontane,
7,10,17,20-tetraaza-5,22-dimethyl-13,14,-dithiahexacosane,
11,14,21,24-tetraaza-17,18-dithiatetratriacontane,
13,16,23,26-tetraaza-19,20-dithiaoctatriacontane,
19,22,29,32-tetraaza-25,26-dithiapentacontane,
and the like;
and bis(oxyalkylaminoalkylaminoalkyl) disulfides such as
4,7,14,17-tetraaza-10,11-dithiaeicosane-1,20-diol,
3,6,13,16-tetraaza-9,10-dithiaoctadecane-1,18-diol,
7,10,17,20-tetraaza-13,14-dithiahexacosane-1,26-diol,
4,7,14,17-tetraaza-10,11-dithiaeicosane-2,19-diol,
4,7,14,17-tetraaza-10,11-dithiaeicosane-1,2,19,20-tetraol,
6,9,16,19-tetraaza-3,22-dioxa-12,13-dithiatetracosane-1,24-diol, and so forth.

Conditions for the preparation of the amines of the present invention from the disulfides may comprise merely contacting the disulfide with an alkali metal bisulfite such as sodium, lithium or potassium bisulfite, in aqueous solution. Their ratio is usually desirably at least about 4 moles of the bisulfite salt per mole of the disulfide, and a higher ratio, ranging up to 10 or 20 moles of bisulfite per mole of the disulfide, may be used. Temperatures may range from above freezing to below the decomposition temperatures of reaction mixture components; usually heating is not required, and the range of 25–75° C. is generally suitable. Pressure may also vary over a wide range, such as from sub-atmospheric pressures of down to, say, 50 millimeters Hg, up to superatmospheric pressures of 1000 pounds per square inch or above. Generally, atmospheric pressures are suitable. The organic product obtained, which is a salt (inner salt, with large excesses of bisulfite) is recovered from the reaction mixture by usual methods such as crystallization, extraction or the like; it may be further purified as discussed hereinafter.

In conducting the reaction of the disulfide with bisulfite, half the disulfide is converted to thiosulfate, and half to the corresponding mercaptan, which is a by-product. As set forth in the copening, concurrently filed application of John C. James, assigned to the same assignee as the present invention, yields of thiosulfates from disulfides can be substantially increased by including hydrogen peroxide in the reaction mixture, and this method is advantageously applied in the present reaction. A ratio of 1 mole of the peroxide per mole of disulfide is useful.

It is to be appreciated that other procedures for thiosulfate synthesis, employing organic halides for example, may be applied to preparation of the present novel amines if desired, and the above-discussed synthesis methods are illustrative but not limiting.

*Amide synthesis*

The present invention also provides amides of the above-described substituted-alkyl aminoalkyl thiosulfuric acid salts. As mentioned above, hydroxy groups on starting materials for the synthesis of these aminoalkyl thiosulfuric acid compounds such as the epoxides may sometimes advantageously be blocked, by substitution of an alkanoyl group for the H of the OH groups, to prevent reaction of the H of OH groups with certain reagents. Subsequent hydrolysis will restore the OH group, to produce the alkanols of this invention.

It has been discovered in preparation of the presently provided aminoalkyl thiosulfuric acid compounds that amides of the amines may be formed by transposition of the alkanoyl group from an O to an N atom, on mixing an alkanoyloxyalkyl aminoalkyl thiosulfuric acid salt with basic media such as aqueous ammonia.

As further set forth hereinafter, the presently provided amides may alternatively be produced, advantageously, by acylating a hydroxyalkyl aminoalkyl thiosulfuric acid salt as provided by this invention, and then hydrolyzing to free the OH groups.

The stated reaction involving a shift of alkanoyl groups from O to N atoms is a two-step reaction in which the first step is reaction of an alkanoyloxy-substituted epoxide with an aminoalkyl thiosulfuric acid alkali metal salt as described hereinabove. This provides an alkanoyloxy- and hydroxy-substituted alkyl aminoalkyl thiosulfuric acid alkali metal salt. When this product is now mixed with a basic hydrolyzing agent, the alkanoyl group displaced by hydrolysis from the oxyalkyl radical may attach itself to the amine N atom, producing an amide. The reaction is illustrated by the exemplary equations:

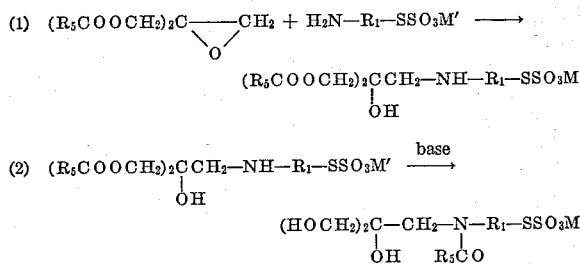

where each R (each of $R_1$ and $R_5$) is saturated aliphatic hydrocarbon, and $M'$ is an alkali metal cation.

2,3 - epoxy - 2-hydroxymethylpropanol diacetate and sodium S-(2-aminoethyl)thiosulfate are illustrative of epoxides and aminoalkylthiosulfates producing alkanoyloxyalkyl aminoalkyl thiosulfates which thus form amides on basic hydrolysis. Various other epoxides, containing from 1 to 5 alkanoyloxy substituents, as exemplified by the alkanoyloxy epoxides listed hereinabove, can be used instead. The useful aminoalkylthiosulfates, as will be appreciated from the above equation, must contain at least two H atoms as amine substituents; where they have three amino H substituents and the epoxide has more than one alkanoyloxy substituent, a diamide may result. The useful aminoalkyl thiosulfate salts include the alkali metal sats of primary-aminoalkylthiosulfuric acids as listed hereinabove, for example.

To effect amide formation, the alkanoyloxyalkyl amino-alkyl thiosulfate salts resulting from reaction of the stated epoxides and aminoalkylthiosulfates are mixed with a basic hydrolysis reagent. The basic reagents useful in this connection are those usually employed for hydrolysis of organic esters such as aqueous solutions of a base like NaOH, KOH or the like, or ammonium hydroxide, and the hydrolysis conditions are those usual for organic ester hydrolysis, such as from above freezing temperatures of the solutions at atmospheric pressure to reflux temperatures of aqueous solutions. The amides can be recovered from the reaction mixtures by usual means, such as extraction or the like.

Alternatively, the presently contemplated amides may be produced by acylation of a hydroxyalkyl aminoalkyl thiosulfate salt as provided by this invention, followed by hydrolysis to regenerate the hydroxy groups. This is a general reaction, whereas the above-discussed rearrangement reaction is dependent on appropriate stereochemistry. Acylating agents useful in this connection are acid halides and anhydrides in which the acyl group is $R_5CO—$, where $R_5$ is saturated aliphatic hydrocarbon of 1 to 18 (and preferably 1 to 6) C atoms, such as acetyl chloride, propionyl chloride, butyryl chloride, caproyl chloride, capryl chloride, and so forth, or acetic anhydride, propionic anhydride, butyric anhydride, valeric anhydride, enanthic anhydride, caprylic anhydride and so forth. The conditions for the acylation comprise contacting a hydroxyalkyl aminoalkyl thiosulfuric acid or its alkali metal salt, containing from 1 to 2 amino N atoms of which at least one is H-substituted, as provided by this invention, with the acylating agent in an amount to provide at least one acyl ($R_5CO-$) group for each hydroxy group and for the H-substituted amino N atom which is to be acylated. Depending on the reactants, the temperatures to be used to effect acylation of the OH and the NH groups may vary from temperatures where the reaction mixture is barely liquid up to any temperature below decomposition temperatures of the reaction components, and pressures may be varied from subatmospheric to superatmospheric, but usually 0–150° C. at atmospheric pressure is suitable. Solvents and diluents which are inert organic liquids like benzene, hexane, dioxane, ethylene dichloride and the like may be present. When the acylation is complete, usual means such as evaporation, extraction and the like may be used to recover the products, which are N-(alkanoyloxyalkyl)-alkylamidoalkyl thiosulfuric acids or their alkali metal salts.

The stated products are now hydrolyzed, producing the desired N-(hydroxyalkyl)alkylamidoalkyl thiosulfuric acid compounds. In this step, either basic or acidic hydrolysis reagents can be used, and those may be any of the reagents usually employed for hydrolysis of organic esters, such as aqueous sulfuric or hydrochloric acid, aqueous NaOH or KOH, liquid ammonia and the like, contacted with the N-alkanoyloxyalkyl compounds under conditions usual for organic ester hydrolysis (such as stirring at room temperature and pressure or at elevated or lower temperatures and pressures in suitable instances), and in amounts sufficient to provide at least a mole of hydrolysis reagent for each mole of alkanoyloxy groups in the thiosulfuric acid compound. The resulting N-(hydroxyalkyl)alkylamidoalkyl thiosulfuric acid compounds are isolated from the reaction mixture by usual procedures such as distillation and extraction.

*Purification*

The presently provided hydroxyalkyl-, aminoalkyl- and oxyalkylaminoalkyl-substituted aminoalkyl thiosulfuric compounds are generally useful for certain drug uses, particularly as antiradiation drugs, as set forth further hereinafter. For drug or pharmaceutical purposes, purity of these compounds is of importance. Byproducts of synthesis methods and other adulterants introduced during their synthesis, if not removed before pharmaceutical administration of these compounds, may produce toxic reactions; also, calculation of proper dose rates requires pure materials.

In certain cases, the alkali metal salts of the present novel compounds are crystalline at room temperature, and can be separated from other components of the reaction mixture in which they are formed by crystallization. They are then easily purified, by recrystallization.

Frequently, however, the presently provided salts, including the alkali metal and the inner salts, are difficult or impossible to separate by crystallization. Physical methods such as recrystallization, extraction, and the like are not sufficient to separate these salts from other salt components of the reaction mixtures, such as S-(2-aminoethyl)thiosulfuric acid sodium salt, or inorganic salts like sodium chloride (formed upon acidification of the reaction mixture with HCl), and sodium sulfite and bisulfite.

The desired isolation of the substantially pure products of this invention, it has been found, can then be accomplished by contacting the products with ion exchange resins.

There are three general methods useful in this connection, depending on the nature of the product.

The mono-amino acids (inner salts) of the invention, produced by reaction of a disulfide with sodium bisulfite or by acidification of the reaction product of an epoxide with an alkali metal aminoalkyl thiosulfate salt, are generally contaminated with an alkali metal halide like NaCl. They may also be admixed with materials like $NaHSO_3$, $Na_2SO_3$ and aminoalkyl thiosulfate salts. Purification of these mono-amino acid products is accomplished by treatment with a strongly basic (quaternary ammonium groups) anion exchange resin in the chloride form.

The impure product is absorbed on a column of the ion exchange resin and then the column is eluted with solvents. The elution initially displaces the inorganic salts from the column. The product, which remains on the column while these salts are washed out, may now be displaced from the column by continued elution, using a more powerfully eluotropic solvent if necessary. Aminoalkylthiosulfate salts present are sometimes displaced by elution after the inorganic salts and before the compounds of this invention; otherwise, if they elute with the desired compounds, they can subsequently be separated therefrom by fractional crystallization.

The mono-amino thiosulfuric acid alkali metal salts of the invention can if desired be converted to the substantially pure acids (inner salts) by treatment of the salts with a weakly acidic (carboxylic acid groups) cation exchange resin. The alkali metal cation of the salt exchanges with the hydrogen cations of the resin and is retained on the resin, while the product displaced from the resin by elution is substantially pure mono-amino substituted-alkyl aminoalkyl thiosulfuric acid.

The diamine salts of the invention are obtained as acid addition salts of the acids (inner salts), as exemplified by

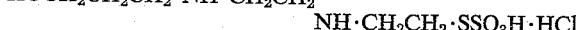
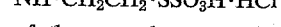

Inorganic salt contamination of these products can be removed by treatment of the acid addition salts with a strongly basic (quaternary ammonium groups) anion exchange resin, suitably in the chloride form. Separation takes place generally as described above with reference to purification of the mono-amine acids of the invention, producing the substantially pure acid addition salt of the diamino acid.

The stated acid addition salt may, if desired, be converted to the free base by treatment with a weekly basic (ammonium group) anion exchange resin in the hydroxide form. The cation of the acid addition salt (for example, $Cl^-$) exchanges with the $OH^-$ cations of the resin and is retained on the resin, while the products displaced from the resin are water and the substantially pure aminoalkyl aminoalkyl thiosulfuric acid, which is readily dehydrated. The stated diamino acid product may, if desired, then be combined with other acids to provide different acid addition salts than the original one.

In conducting the treatment of the present products by ion exchange resins as discussed above, the procedures used are those usual in chromatographic absorption and separation techniques employing an ion exchange resin.

Ion exchange resins of the above-stated characters are well known in the art. The stated strongly basic anion exchange resins, for example, may be prepared as described in U.S. Patent 2,591,573. Thus, polystyrene cross-linked with divinylbenzene is chloromethylated to introduce a chloromethyl group on the benzene ring of the styrene residue, and the chloromethylated resin is reacted with trimethyl amine to produce quarternary ammonium chloride groups. Other amines can be used to quaternize the resin, such as benzyldimethylamine, hydroxyethyldimethylamine and the like. For weakly basic anion exchange resin synthesis, a chloromethylated resin prepared as stated may be reacted with ammonia, providing ammonium ($-NH_3^+Cl^-$) groups; washing the resin with base such as aqueous $NH_4OH$ converts the resin to the hydroxide ($-NH_3^+OH^-$) form. Other procedures can be used also to provide anion exchange resins, such as nitrating cross-linked polystyrene, reducing the nitro group to an amino group, and treating the amino-substituted polymer to provide an ammonium or quarternary ammonium salt radical, and so forth. Weakly acidic cation exchange polymers are exemplified by a methacrylic acid polymer; other addition polymers of vinyl monomers having carboxylic acid group substituents may also be used. Usually these resins are prepared advantageously by hydrolyzing a cross-linked vinyl acid polymer derivative such as an ester to produce the acid form, as is known in the art. Details of the preparation and regeneration of ion exchange resins are generally readily available in the literature, and the resins are articles of commerce.

Treatment of the present products with the ion exchange resin is conducted as usual in chromatographic separation and ion exchange techniques. The resin is used in particulate form, packed in a bed open at top and bottom, which is usually desirably tall and narrow in shape, to maximize the travel path of the fluid mixture being treated. It is desirable to wet the adsorbent initially with the same solvent as will be used to provide the solution of the organic product. Then the solution of the product is introduced into the bed of adsorbent. The ratio of weight of product to weight of adsorbent will be maximized to the extent consistent with effective separation, for the sake of economy, but usually will be in the range of 1 part of material comprising the product to at least 5 parts of adsorbent resin.

The solvent used to dissolve the product will suitably be the least polar available fluid with solvent power for the substituted-alkyl aminoalkyl thiosulfuric acid compound. Methanol is broadly suitable, and is preferred; other lower alkyl alcohols like ethanol and propanol may sometimes be used, or even ethers such as dimethoxyethane and tetrahydrofuran; or halohydrocarbons such as methylene dichloride or dibromide.

Addition of the solution of the substituted-alkyl aminoalkyl thiosulfuric acid compound to the bed of adsorbent is now followed by addition of an eluting solvent. This may be the same as the solvent used to prepare the solution of the mixture, or where this is ineffective to displace the inorganic salts from the adsorbent, a mixture of it with a minor amount of a more polar solvent, higher in the eluotropic series, may be used. (For the eluotropic series, see p. 251, H. G. Cassidy, "Fundamentals of Chromatography," Interscience, 1957.) To avoid unselective desorption of the organic compounds present from the adsorbent during purification, the amount of more powerfully eluting solvent used should be minimized as far as possible: for example, in using a mixture of methanol with water, where water is the more polar solvent, the water is usually advantageously 50% or less of the total volume.

In purification, with a suitable solvent such as methanol, the inorganic salts will be eluted from the column without substantial elution of the organic thiosulfuric acid salts. The process of desalting can be followed by testing the eluant for the presence of inorganic salts. When these are no longer being eluted from the column, organic product elution will start. If organic product comes through mixed with the inorganic salts as the elution continues, these eluant fractions can be recycled through a second absorption and elution process. If the organic product resists elution, solvents can be used which are higher in the eluotropic series than that used to elute the inorganic salts, such as mixtures of methanol and water, or water itself. The eluant then issuing from the bed will be a solution of the desired organic thiosulfuric acid salt, substantially free of inorganic salts, from which the organic salt can be recovered by usual means such as evaporating off the solvent.

The above-described operations can be conducted in a batch or continuous manner. A moving bed of adsorbent can be used; and, similarly, other commercially operable procedures for conducting adsorption processes can be employed.

Solvent removal from the eluant fractions containing the organic products may produce substantially pure products directly; as noted above, if any unsubstituted-aminoalkylthiosulfuric acid salt remains mixed with the product, it can be separated by fractional crystallization to produce the presently provided products in substantially pure form.

Acid addition salt formation

When the presently provided compounds contain two amino N atoms (not acylated) they form acid addition salts. In accordance with the above-discussed chemistry of the present compounds, acidification of the present alkali metal salts produces inner salt formation with a first amine group, thus internally neutralizing it. However, when a second amino N atom is present, no acid group being available to combine with it, it can make the compound basic in reaction. Particularly for pharmaceutical applications, it is desirable to neutralize such basic amino N groups by acid addition salt formation.

As discussed hereinabove, the present diamino thiosulfuric acids may conveniently be prepared by reacting a disulfide with sodium bisulfite. Addition of acid to the resulting product produces an acid addition salt. If desired, this product may be purified, by treating it with a strongly basic anion exchange resin to remove impurities such as inorganic salts.

For acidification prior to purification, an inorganic acid like HCl is desirable. Contaminant salts formed by the acid anion are then inorganic, facilitating removal of such salts in purification procedures as described. However, addition salts of the present diamines with organic acids such as tartaric acid are sometimes desirable; they may be crystalline whereas the mineral acid salts are not, for example. As above described, the acid addition salts of the present diamines can be converted to the free base by treatment with a weakly basic anion exchange resin. Addition of the desired acid to the pure base then produces the corresponding acid addition salt.

Acidification will be desirably conducted in water solution, while the mixture of amine product and acid is cooled, as for example by chilling in an ice bath. The acid used may be any strong proton donor which will form an acid salt with the amine product. Desirably it will be a physiologically acceptable acid forming a physiologically acceptable addition salt with the amine product, adapted, for example, for use in physiological applications such as administration of parenteral injections to animals. Useful acids, including physiologically acceptable acids, for forming salts with amines are known in the art. Thus for example, such useful acids include inorganic acids such as hydrochloric, hydrobromic, sulfamic, phosphoric and nitric acids, and organic acids such as maleic, fumaric, succinic, methanesulfonic, tartaric, citric, gluconic, itaconic and p-toluenesulfonic acids. Depending on the intended use of the product, indeed a toxic acid, such as picric, picrolonic or oxalic acid, may be used if desired. To form the addition salt, sufficient acid will be added to provide one mole for each mole of the amine compound. Excess acid may be used. The organic amine salt may be separated by evaporating the aqueous acid solution to dryness under reduced pressure, and then extracting the residue with a solvent, such as an alcohol, for the organic amine salt. Suitable solvents include methanol, ethanol, isopropyl alcohol and so forth.

The products

The various substituted-alkyl aminoalkyl thiosulfuric acids and salts, their amides and their addition salts provided by this invention range from mobile liquids to crystalline solids. The salts are generally slightly soluble in lower alkanols such as methyl, ethyl and isopropyl alcohol; they are very soluble in water, and many of them are quite hygroscopic. They are useful for a wide variety of industrial, pharmaceutical and agricultural applications. These compounds, especially the non-acylated secondary amines, have unusual activity in protecting micro-organisms and mammals against the harmful effects of ionizing radiation. The substituted-alkyl portion of the molecules of these compounds favorably changes their solubility and biological transmission as compared to previously known aminoalkylthiosulfuric acid salts. Administration of the present compounds may be effected by usual pharmaceutical methods. For example, simply dissolving the amine salts in water may give a pharmaceutically acceptable solution adapted for parenteral administration by injection. Effective dosage levels generally range from 50 to 750 mg. of the amine salt per kg. body weight. The amines may if desired be combined with other materials such as copper compounds to achieve additional pharmaceutical and medicinal effects; they may be administered orally, as for example in the form of gelatin capsules; and other variations within the usual skill of the pharmaceutical art may be made.

Additional uses for these compounds include application as chelating agents, as for example to prevent metal ions from precipitating from solution; the compounds containing each of the —$SSO_3H$, —OH and —NH configurations are especially valuable in this connection. Further, they may be used as chemical intermediates, for example, to prepare corresponding thiols useful, for example, in anti-radiation drug therapy. The tertiary amines are adapted for quaternization to provide bactericidal and detergent products. Alkylamino alkylamino compounds of the invention including higher ($C_{7-18}$) alkyl radicals, such as the hydrochloride salt of S-[2-([3-(n-decylamino)propyl]amino)ethyl]thiosulfuric acid, can be used as such as surface active agents. The various products of the invention, and especially those containing a basic amino N atom can also be employed as agricultural toxicants, to rid soil and plant stands of undesirable vegetation (including defoliation), nematodes, insects, fungi and the like; and as microbiological toxicants. Particular uses of these novel products vary, depending on the various several classes of products provided hereby to which they belong, including hydroxy-substituted-alkyl aminoalkyl thiosulfuric acid salts, alkylamino-substituted-alkyl aminoalkyl thiosulfuric acid salts, hydroxy-substituted-alkyl aminoalkyl aminoalkyl thiosulfuric acid salts, amides of the several stated classes of compounds, and so forth.

The invention is illustrated but not limited by the following examples, in which all temperatures are degrees C.

*Example 1.*—S-[2-(3-hydroxypropylamino)ethyl] thiosulfuric acid $$HOCH_2CH_2CH_2NHCH_2CH_2SSO_3H$$

This example illustrates the preparation of a mono-hydroxyalkyl aminoalkyl thiosulfuric acid of this invention, and illustrates preparation of products in accordance with this invention by reaction of a disulfide with a bisulfite salt.

A mixture of 20 grams (g.) of 4,11-diaza-7,8-dithiatetradecan-1,14-diol (0.075 mole) in 50 milliliters (ml.) of water with 78 g. of sodium bisulfite (0.75 mole) in 500 ml. of water is stirred for 16 hours at room temperature (20–25°). The mixture is then flash-evaporated to a slushy residue which is extracted with 500 ml. of isopropyl alcohol (iPrOH). Filtration and removal of solvent from the extract leaves 30 g. of a viscous oil, which is taken up in 50 ml. of methanol (MeOH) and acidified to about pH 5 with 4.5 ml. of 6 N HCl. The removal of MeOH and water leaves a viscous oil that is dried by adding 300 ml. of iPrOH followed by removal of same on a flash evaporator. The resulting oily impure S-[2-(3-hydroxypropylamino)ethyl]thiosulfuric acid is taken up in 25 ml. MeOH, filtered to remove suspended salts, and the filtrate diluted with 125 ml. MeOH.

"Dowex 1-X4," 20–50 mesh, strongly basic, anion exchange resin, chloride ion form, is washed with water and then with methanol, poured into a 4 centimeter (cm.) x 75 cm. glass column to form a 4 x 50 cm. bed, and washed again with a liter of MeOH. The MeOH solution of the hydroxypropyl aminoethyl thiosulfuric acid product produced as above-stated is introduced into the column at the rate of about 3–4 ml. per minute. The column is now eluted at about the same rate with 600 ml. MeOH, then 360 ml. of a 1:1 MeOH:$H_2O$ mixture, and finally 1800 ml. of water. The desalting taking place is followed using aqueous silver nitrate to test for $Cl^-$ ion (acidified with $HNO_3$) and micro thin layer chromatography (silica gel, developed with a 4:4:1, by volume, chloroform-methanol-water mixture, and stained with iodine) for organic components. The first 600 ml. of eluant contains the bulk of the NaCl contaminant and very little product. Most of the product is contained in the 360 ml. of 50% aqueous MeOH eluant and the first 600 ml. of water eluant, which are combined and concentrated to yield 10 g. of an oil. Trituration of the oil in 100 ml. of absolute ethanol (EtOH) causes crystallization and gives a granular solid which is recrystallized from 125 ml. EtOH to provide 6.3 g. of colorless crystalline S-[2-(3-hydroxypropylamino) ethyl]thiosulfuric acid, M. 91–93°.

Calcd. for $C_5H_{13}NO_4S_2$: C, 27.9; H, 6.1; N, 6.5; S, 29.8%. Found: C, 28.1; H, 6.1; N, 6.7; S, 29.9%. Titration of an analytical sample with standard tetrabutylammonium hydroxide solution indicates a purity of 96.3%.

The 4,11-diaza-7,8-dithiatetradecan-1,14-diol is prepared from 3 - [(2 - mercaptoethyl)amino]propanol. A solution of 60 g. ethylene sulfide (1 mole) in 100 ml. of benzene is added dropwise at reflux in 4 hours to an azeotropically dried solution of 450 g. 3-aminopropanol (6 moles) in 2400 ml. of anhydrous benzene. The mixture is refluxed for another hour, solvent is removed by evaporation, and unreacted amino alcohol is removed by reduced pressure distillation, to give 70.4 g. of 3-[(2-mercaptoethyl)amino]propanol, B. 76–80°/0.10–0.15 mm. A 3% aqueous solution of hydrogen peroxide (187 g., 0.15 mole) is added dropwise in ½ hour to 45 g. (0.33 mole) in 120 ml. of water at 10–20°. The reaction mixture, which then gives a negative thiol test with sodium nitroprusside reagent, is acidified by addition of 55 ml. of 6 N CHl. Removal of water and trituration of the residue with iPrOH leaves a granular solid, which is recrystallized from 600 ml. EtOH to provide 44.5 g. of 4,11-diaza-7,8-dithiatetradecan-1,14-diol dihydrochloride, colorless crystals, M. 153–155°.

Calcd. for $C_{10}H_{26}Cl_2N_2O_2S_2$: C, 35.2; H, 7.7; Cl, 20.8; S, 18.8%. Found: C, 34.8; H, 7.8; Cl, 20.5; S, 18.7%.

The free base is prepared by stirring 25.6 g. of this dihydrochloride with 8.1 g. of sodium methoxide in 300 ml. EtOH for ½ hour. Removal of NaCl by filtration and evaporation of solvent from the filtrate leaves 20 g. of the viscous oily 4,11-diaza-7,8-dithiatetradecan-1,14-diol.

*Example 2.*—S-[2-(2-hydroxypropylamino)ethyl] thiosulfuric acid

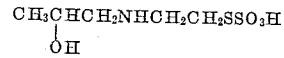

This example illustrates the preparation of a hydroxy-alkyl aminoalkyl thiosulfuric acid of this invention, by reaction of an epoxide with a 2-aminoalkylthiosulfuric acid salt.

1,2-epoxypropane (12 g., 0.2 mole) is added dropwise in 2 hours at 50–55° to a solution of sodium S-(2-aminoethyl)thiosulfate (95 g., 0.53 mole) in 400 ml. MeOH, and stirring is continued for an hour at the same temperature. The reaction mixture is cooled to room temperature, acidified to pH 6 with 88 ml. of 6 N HCl, and stirred for 30 minutes. The solid precipitate (which is S-(2-aminoethyl)-thiosulfuric acid) is removed by filtration, and the filtrate evaporated down to a pasty residue. Extraction, filtration and evaporation are repeated three times, using successively 300, 100 and 50 ml. of MeOH. The undissolved solids left by these extractions are mixtures of NaCl and S-(2-aminoethyl)thiosulfuric acid. Concentration and drying of the last filtrate leaves 51.6 g. of impure S - [2 - (2 - hydroxypropylamino)ethyl]thiosulfuric acid as a yellowish, viscous oil.

A column of "Dowex 1–X4" strongly basic anion exchange resin, chloride ion form is prepared as described in Example 1. About half of the above oily product is dissolved in 150 ml. MeOH, placed on the column at a rate of 1.5 ml./min., and eluted with 730 ml. MeOH at 3 ml./min., then 200 ml. of a 1:1 MeOH:H₂O mixture and finally 950 ml. of water. The first 730 ml. of eluant contain all of the NaCl and no product. The remainder of the eluant contains the product, which is recovered by the removal of solvents. The residue is dissolved in 40 ml. MeOH, seeded with 0.1 g. of S-(2-aminoethyl)thiosulfuric acid and allowed to stand at room temperature. On standing for several days, this seeded mixture yields 1 g. of S-(2-aminoethyl)thiosulfuric acid. The mother liquor is diluted with 100 ml. EtOH, seeded with 0.1 g. of S-(2-aminoethyl)thiosulfuric acid and allowed to stand several days, during which two more small crops of S-(2-aminoethyl)thiosulfuric acid totaling 0.3 g. are obtained. The mother liquor is diluted with another 100 ml. EtOH and allowed to stand at room temperature. Successive crops of product now precipitating at this concentration and at reduced volumes of the mother liquor are combined and recrystallized from a mixture of MeOH and EtOH to give 4.0 g. of S-[2-(2-hydroxypropylamino)ethyl]-thiosulfuric acid, colorless crystals, M. 113–116°.

Calcd. for $C_5H_{13}NO_4S_2$: C, 27.9; H, 6.1; N, 6.5; S, 29.8%. Found: C, 27.9; H, 6.1; N, 6.3; S, 30.0%.

Titration for thiosulfuric acid group: milliequivalents (meq.) titrated, 0.4255 and 0.4728; meq. found, 0.4280 and 0.4718. Purity factor, 100.6%, 99.8%.

*Example 3.—S-[2-(2,3-dihydroxypropylamino)ethyl] thiosulfuric acid*

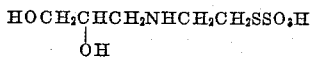

This example illustrates the preparation of a poly-hydroxyalkyl aminoalkyl thiosulfuric acid in accordance with this invention.

2,3-epoxy-1-propanol (14.8 g., 0.2 mole) is added dropwise in 2 hours at 50–55° to 108 g. of sodium S(-2-aminoethyl)thiosulfate (0.6 mole) in 400 ml. MeOH. The mixture is stirred at reflux for 1 hour, then cooled in an icewater bath and acidified to pH 5 with 98 ml. of 6 N HCl. Precipitated S-(2-aminotehyl)thiosulfuric acid is removed by filtration, and the filtrate is concentrated to a pasty residue, which is extracted with 300 ml. of warm MeOH, leaving 17 g. of undissolved solids (discarded). Treatment of the MeOH extract with charcoal leaves a pale yellow solution from which the solvent is removed. The pasty residue is extracted with 100 ml. MeOH at room temperature, the MeOH extract is concentrated and dried, and the oily residue is dissolved in 50 ml. MeOH and allowed to stand at room temperature overnight. Filtration and concentration of the filtrate leaves 43.5 g. of impure S-[2 - (2,3-dihydroxypropylamino)ethyl]thiosulfuric acid as a yellow viscose oil.

A 4 x 40 cm. (wet resin bed) column of "Dowex 1–X4" 20–50 mesh, anion exchange resin (chloride ion form) is washed with several liters of water. The 43.5 g. of oily product is dissolved in water to a volume of 400 ml. In successive 200 ml. portions, this solution is placed on the column at a rate of 2 ml./min. and eluted with 1050 ml. of water at 2–3 ml./min. The first 650 ml. of eluant contain NaCl; the last 600 ml. of eluant contain essentially salt-free product. The substantially salt-free fractions are combined and concentrated. The oily residue is dissolved in 150 ml. MeOH, concentrated to a viscous residue, and dried under vacuum. The pasty residue is triturated in 75 ml. MeOH to give a thick white paste, from which the solid is removed by filtration and dried in a vacuum oven to give the product. Two recrystallizations from MeOH now give 3.5 g. of substantially pure S-[2-(2,3 - dihydroxypropylamino)ethyl]thiosulfuric acid as colorless crystals, M. 117–119°.

Calcd. for $C_5H_{13}NO_5S_2$: C, 26.0; H, 5.7; N, 6.1; S, 27.7%. Found: C, 26.0; H, 5.7; N, 6.0; S, 27.9%.

Titration of the thiosulfuric acid group: meq. titrated, 0.4038 and 0.4712; meq. found, 0.3994 and 0.4698. Purity factor, 98.9%, 99.7%.

*Example 4.—dl-Threo-S-(2-[2,3-dihydroxy-1-(hydroxymethyl)-propylamino]ethyl)thiosulfuric acid*

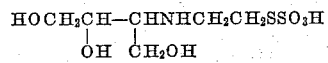

This example illustrates the preparation of another hydroxyalkyl aminoalkyl thiosulfuric acid in accordance with this invention.

A solution of 20.8 g. (0.2 mole) of cis-2,3-epoxy-1,4-butanediol (U.S. 2,870,171) in 120 ml. MeOH is added quickly to a stirred refluxing mixture of 71.6 g. (0.4 mole) of sodium S-(2-aminoethyl)thiosulfate in 400 ml. MeOH. Stirring and refluxing are continued for 6 hours. The resulting solution is acidified with 33 ml. of 12 N HCl and then 4 ml. of 6 N HCl to precipitate 36.7 g. of S-(2-aminoethyl)thiosulfuric acid. Chilling the mother liquor (−25°) followed by concentration produces two successive crops of white solid (2.5 g. and 10 g.), each of which is mainly inorganic salts (NaCl, Na₂SO₃ and NaHSO₃). Continued concentration and chilling at −25° of the methanol filtrate yields more white solid (10.4 g.) that is mainly S-(2-aminoethyl)thiosulfuric acid. The resulting MeOH filtrate is treated with activated charcoal, filtered through filter-aid, concentrated, and chilled to precipitate 3 g. more of white solid (mainly Na₂SO₃ or NaHSO₃). Solvent is removed from the MeOH filtrate on a rotary evaporator (water pump/40°) to yield a light tan, viscous oil (35.1 g.). The oil is dissolved in 100 ml. of distilled water and treated with charcoal to remove all color. Removal of solvent on a rotary evaporator first under water pump reduced pressure and then with an oil pump (both temperature 40°) yields impure dl-threo-S-(2-[2,3-dihydroxy - 1 - (hydroxymethyl) propylamino]ethyl) thiosulfuric acid as a viscous oil.

A solution of this product in 100 ml. of distilled water is introduced into a 4 x 34 cm. column of 300 g. of water-washed "Dowex 1–X4" anion exchange resin, chloride ion form. The column is eluted with distilled water. The first 500 ml. of eluant fractions contain both chloride ion and product; the subsequent 700 ml. of eluant contain only product. The latter is concentrated to yield 5.1 g. of salt-free, colorless viscous oil. The former eluant is reduced in volume by about two-thirds and passed through the column again to give similar eluant fractions, of which the chloride-ion free portion is concentrated to yield 5.8 g. of salt-free colorless viscous oil.

The oils are combined, slurried in 125 ml. MeOH, and filtered to remove S-(2-aminoethyl)thiosulfuric acid. The MeOH filtrate is concentrated and the oily residue dried for 5 hours at 30–35°/1 mm. to yield 9.0 g. of substantially pure dl-threo-S-(2-[2,3-dihydroxy-1-(hydroxymethyl)propylamino]ethyl)thiosulfuric acid.

Calcd. for $C_6H_{15}NO_6S_2$: C, 27.6; H, 5.8; N, 5.4; S, 24.5%. Found: C, 27.5; H, 5.1; N, 5.4; S, 24.5%.

*Example 5.—S-(2-[3-(2-hydroxyethoxy)-2-hydroxypropylamino]ethyl)thiosulfuric acid*

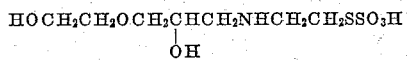

This example illustrates the preparation of a hydroxyalkoxyalkyl aminoalkyl thiosulfuric acid in accordance with this invention.

1,2-epoxy-3-(2-hydroxyethoxy)propane (prepared by the method of Kharasch et al., J. Org. Chem. 8 (1943), 189) (22.4 g., 0.19 mole), is added dropwise in 1 hour at 55° to a solution of 104 g. of sodium S-(2-aminoethyl) thiosulfate (0.58 mole) in 400 ml. MeOH. After stirring for 2 hours at 55°, the mixture is cooled in ice water and acidified to pH 6 with 96.5 ml. of cold 6 N HCl. An abundant precipitate, predominantly S-(2-aminoethyl) thiosulfuric acid, is removed by filtration ½ hour later. Removal of solvent from the filtrate leaves a slushy residue, which is extracted with 100 ml. MeOH, leaving 12 g. of a solid, predominantly NaCl. Solvent is removed from the extract, and the residue is redissolved in 100 ml. MeOH. After standing overnight at room temperature (20–25°), the solution is filtered to remove precipitate (mixture of sodium chloride and S-(2-aminoethyl)thiosulfuric acid). Removal of solvent from the filtrate leaves a glass that is dried for 8 hours at 40–45°/1–2 mm., then redissolved in 80 ml. MeOH and let stand at room temperature for 6 days. Precipitate is removed by filtration and solvent is removed from the filtrate, leaving a residue that is dried for 6 hours at 40°/1–2 mm. to give a 59 g. glassy residue of impure S-(2-[3-(2-hydroxyethoxy)-2-hydroxypropylamino]ethyl)thiosulfuric acid.

A column of "Dowex 1-X4" anion exchange resin, chloride ion form, is prepared as described in Example 1. A solution of 58 g. of the above glassy residue in 174 ml. MeOH is placed on the column at the rate of 2 ml./min. and eluted at about the same rate with 540 ml. MeOH, then 200 ml. of a 1:1 MeOH:$H_2O$ mixture, and finally 2 liters of water at 4 ml./min. The first 650 ml. of eluant contain the bulk of the NaCl and very little product. Removal of solvent from the next 1850 ml. of eluant and drying for 5 hours at 40–45°/1–2 mm. leaves 42 g. of a nearly colorless, viscous oil. This viscous residue is dissolved in 50 ml. MeOH and let stand 3 days, producing a 0.5 g. precipitate of S-(2-aminoethyl)thiosulfuric acid. The mother liquor is diluted with 20 ml. MeOH and 100 ml. EtOH is added (cloud point). Enough MeOH (5 ml.) is then added to prevent the oil from separating, and a trace of authentic S-(2-aminoethyl)thiosulfuric acid is added for seed crystals. A total of 1.0 g. of S-(2-aminoethyl)thiosulfuric acid is precipitated in 4 days. After 3 more days, solvent is removed to leave a viscous residue which is dried at 40–45°/1 mm. to yield 39.6 g. of nearly colorless, glassy, substantially pure S-(2-[3-(2-hydroxyethoxy)-2-hydroxypropylamino]ethyl)thiosulfuric acid.

Calcd. for $C_7H_{17}NO_6S_2$: C, 30.5; H, 6.2; N, 5.1; S, 23.3%. Found: C, 30.0; H, 6.5; N, 5.0; S, 23.5%.

Titration of thiosulfuric acid group: meq. titrated, 0.5985; meq. Found, 0.5992. Purity factor 100.1%.

*Example 6.—Sodium S-[2-(2,3-dihydroxy-3-methylbutylamino)ethyl]thiosulfate*

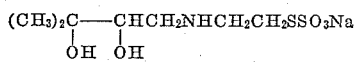

This example illustrates the preparation of a (hydroxyalkylamino)alkylthiosulfuric acid sodium salt in accordance with this invention.

3,4-epoxy-2-methyl-2-butanol (prepared by the method of Payne, J. Org. Chem., 27 (1962), 3819) (10.2 g., 0.1 mole) is added over ½ hour to a stirred solution of sodium S-(2-aminoethyl)thiosulfate (17.9 g., 0.1 mole) in 100 ml. portions of anhydrous ether. The white solid is reaction mixture is refluxed for 16 hours and then concentrated to a clear oil. This oil is dried by azeotropic distillation using three 200 ml. portions of isopropanol, and then taken up in 60 ml. iPrOH. The solution is added dropwise with rapid stirring to 600 ml. of anhydrous (diethyl) ether to yield a white solid. This solid is isolated by filtration in a dry box and triturated three times with 100 ml. portions of anhydrous ether. The white solid is dried overnight in vacuum over phosphorus pentoxide. Substantially pure sodium S-[2-(2,3-dihydroxy-3-methyl-butylamino)ethyl]thiosulfate is recovered as a white hygroscopic solid, M.P. 59–60° (dec.).

Calcd. for $C_7H_{16}NNaO_5S_2$: C, 29.9; H, 5.7; N, 5.0; S, 22.8%. Found: C, 30.0; H, 5.9; N, 4.8; S, 22.6%.

*Example 7.—Sodium S-2[N-(2,3-dihydroxy-2-[hydroxymethyl]propyl)acetamido]ethylthiosulfate*

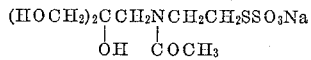

This example illustrates the preparation of an amide derivative of a hydroxyalkyl aminoalkyl thiosulfuric acid in accordance with this invention.

2,3-epoxy-2-hydroxymethyl-1-propanol diacetate (13.6 g., 0.069 mole) is added over a 20 minute period to a stirred solution of S-(2-aminoethyl)thiosulfate (9.5 g., 0.053 mole) in 50 ml. MeOH at room temperature under nitrogen. The reaction mixture is stirred for 20 hours at room temperature and then concentrated to a brown oil. The oil is dissolved in 200 ml. of concentrated ammonium hydroxide, and this solution is stirred overnight at room temperature. Concentration of the reaction mixture yields a brown oil which is extracted with three 100 ml. portions of chloroform (chloroform extracts discarded). The oil is dissolved in water and treated with decolorizing charcoal five times, recovered by concentration, and taken up in 50 ml. MeOH. The MeOH solution is added dropwise with rapid stirring to 700 ml. of anhydrous ether to yield 10.4 g. of sodium S-(2-[N-(2,3-dihydroxy-2-[hydroxymethyl]propyl)acetamido]ethyl)thiosulfate as a tan hygroscopic solid (isolated in a dry box). The product melts at 70–72° and exhibits typical strong amide carbonyl absorption at 6.2μ.

Calcd. for $C_8H_{16}NNaO_7S_2$: C, 29.5; H, 4.9; N, 4.3; S, 19.7%. Found: C, 29.4; H, 4.9; N, 4.0; S, 19.7%.

To provide the 2,3-epoxy-2-(hydroxymethyl)-1-propanol diacetate, an alcohol-free ether azeotrope of diazomethane (30 g., 0.7 mole) in 1200 ml. of anhydrous ether is distilled directly into a stirred mixture of 1,3-diacetoxyacetone (113 g., 0.65 mole) in 250 ml. of chloroform at 0° over 4 hours according to the procedure of Wolfrom et al. (J. Am. Chem. Soc., 63, (1941), 201, 632). The reaction mixture is stirred for another 2 hours at 0° and then kept at room temperature overnight. Solvent is removed and the residual oil distilled through a 1 x 18 in. glass helix-packed column to give 96 g. of epoxide, B.P. 82–84°/0.35–0.40 mm., $n_D^{25}$ 1.4398, $d_4^{25}$ 1.1842.

Calcd. for $C_8H_{15}O_5$: C, 51.1; H, 6.4%. Found: C, 50.9; H, 6.4%.

*Example 8.—S-[2-(2-hydroxyethylamino)ethyl]thiosulfuric acid*

Hydrogen peroxide (3% aqueous, 147 g., 0.13 mole) is added over 1 hour to 31.4 g. 2-(2-mercaptoethyl)aminoethanol (0.259 mole) in 100 ml. of water cooled in ice-water. Addition of 43 ml. of 6 N HCl and removal of water leaves an oil which is triturated in 200 ml. of iPrOH. The resulting solid is recrystallized from 500 ml. to give 28 g. of 3,10-diaza-6,7-dithiadodecan-1,12-diol dihydrochloride, M.P. 144–146°.

A solution of this disulfide salt (28 g., 0.09 mole) in 50 ml. of water is combined with 190 g. of sodium bisulfite (1.8 moles) in 950 ml. of water and stirred at room temperature for 4 hours. Removal of water gives a residue which is successively extracted and the extract concentrated, using 500 ml., 100 ml. and 50 ml. MeOH. The final filtrate is diluted with MeOH to 200 ml. and the solution passed through a column of "Dowex 1-X4" anion exchange resin. The column is eluted successively with 500 ml. MeOH, 400 ml. 1:1 MeOH:$H_2O$ and 1500 ml. of water at a rate of 3 to 4 ml./min. The product is contained in the last 1500 ml. of eluant and predominantly in the first 600 ml. of water eluant from which 14 g. of a viscous oil is obtained upon removal of the water. Removal of water from the last 900 ml. of eluant leaves an additional 3 g. of oil. These two residues are combined and triturated in 150 ml. EtOH to give 15 g. of a fluffy white solid. Recrystallization from a 150:100 ml. EtOH:MeOH mixture gives 12 g. of analytically pure S-[2-(2-hydroxyethylamino)ethyl]thiosulfuric acid, M.P. 106–108°.

*Example 9.—S-(2-[2-(2-hydroxypropylamino)ethylamino]ethyl)thiosulfuric acid*

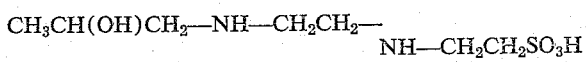

1-[2 - (2 - benzylthioethyl)aminoethyl]amino - 2 - propanol dihydrochloride is prepared by stirring a mixture of 1-(2-benzylthioethyl)aziridine (97 g., 0.5 mole), 1-amino-2-propanol (500 g., 6.7 moles), and ammonium chloride (5.4 g., 0.1 mole) at 120–130° for 4 hours. Excess starting amino alcohol is removed under vacuum, and the distillation residue acidified with 250 ml. MeOH and 200 ml. of 6 N HCl. The acidic mixture is extracted with diethyl ether, and the aqueous layer separated, treated with charcoal and filtered through filter aid. Removel of water from the filtrate leaves an orange solid residue, which is dried by evaporation of iPrOH, and mixed with 250 ml. of iPrOH. The resulting slurry is filtered to obtain a white solid (lustrous plates). This is washed with iPrOH, dried, and recrystallized from hot 1:1 MeOH:EtOH, to give 87.g. of the desired dihydrochloride. An analytically pure sample recrystallized from hot 1:3 MeOH:iPrOH M.P. 191–192°.

To prepare the corresponding thiol, a solution of the 1-[2-(2-benzylthioethyl)aminoethyl]amino - 2 - propanol dihydrochloride (95.5 g., 0.28 mole) in 700 ml. of anhydrous diethyl ether is dissolved in 1 liter of anhydrous liquid ammonia. Sodium (26.5 g., 1.15 gram-atoms) is added in small pieces to the stirred solution in ¾ hour. The ammonia and ether are removed, and the resulting solid residue is acidified under nitrogen with 400 ml. of water and 200 ml. of 6 N HCl. Extraction with 200 ml. ether, and removal of water from the aqueous layer leaves a solid that is extracted with hot MeOH. 1-[2-(2-mercaptoethyl)aminoethyl]-2-propanol dihydrochloride, M. 201–202°, precipitates from the MeOH extract.

To prepare the disulfide, 3% aqueous hydrogen peroxide (110 g., 0.1 mole) is added in ⅓ hour to 47 g. of 1-[2-(2-mercaptoethyl)aminoethyl]amino - 2 - propanol dihydrochloride (0.2 mole) in 300 ml. of water. The water is removed and the resulting yellowish solid dissolved in hot MeOH. Cooling to room temperature yields 4,7,14,17 - tetraaza-10,11-dithiaeicosane-2,19-diol tetrahydrochloride, white solid, M.P. 260–265° (dec.).

To prepare S-(2-[2 - (2 - hydroxypropylamino)ethylamino]ethyl)thiosulfuric acid, the stated disulfide is reacted with sodium bisulfite as described, for example, in Example 1.

*Example 10.—S-(2-[2-(3-hydroxypropylamino)ethylamino]ethyl)thiosulfuric acid tartrate*

HOCH$_2$CH$_2$CH$_2$NHCH$_2$CH$_2$NHCH$_2$CH$_2$SSO$_3$H.C$_4$H$_6$O$_6$

Using procedures as described above, 3-[-2-(2-benzylthioethylamino)ethylamino] - 1 - propanol dihydrochloride M.P. 191–192°, is prepared by reaction of 1-(2-benzylthioethyl)aziridine with 3-amino-1-propanol in the presence of NH$_4$OH in EtOH and acidification with HCl. The free base, produced by reacting the dihydrochloride with sodium methoxide, is reacted with sodium in liquid ammonia to provide 3-[2-(2-mercaptoethylamino)ethylamino]-1-propanol, isolated as the dihydrochloride, M.P. 178–179°. This product is mixed with hydrogen peroxide to produce 4,7,14,17 - tetraaza-10,11-dithiaeicosane-1,20-diol tetrahydrochloride, M.P. 245–247°. A solution of 15 g. of this disulfide and 63 g. NaHSO$_3$ in 300 ml. water at 20° is stirred for 4 hours, water is removed and the product recovered by methanol extraction. This product 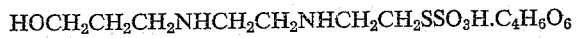 is treated with "Dowex 1–X4," freeing it of impurities, to provide S-(2-[2-(3-hydroxypropylamino)ethylamino]thiosulfuric acid monohydrochloride. A solution of 8 g. of this hydrochloride in 50 ml. H$_2$O is passed through a 2 x 18 cm. column of "AG 11A8," a weakly acidic, cation exchanging acrylic acid polymer in a matrix of a strongly basic anion exchange resin (U.S. 3,041,292). Elution with 250 ml. H$_2$O and removal of water from the second and third 50-ml. eluate fractions gives 5 g. of the corresponding free base as an oil. Mixture of 3 g. (0.0116 mole) of this oil in 75 ml. MeOH with 1.75 g. (0.0116 mole) d-tartaric acid in 75 ml. MeOH gives S - (2 - [2 - (3 - hydoxypropylamino)ethylamino]ethyl)-thiosulfuric acid tartrate, M. 165–167° (dec.).

*Example 11.—S-(2-[2-(n-decylamino)ethylamino]ethyl)thiosulfuric acid*

Following procedures as described above, 93 g. of 1-(2-benzylthioethyl)aziridine is stirred with 225 g. n-decylamine and 5.4 g. NH$_4$Cl at 100° C. for 5 hours. Separation, acidification to pH 5 with 6 N HCl and recrystallization from 4:1 MeOH:EtOH gives 112 g. of N-(2 - benzylthioethyl)-N'-n-decylethylenediamine dihydrochloride, M.P. 245° (dec.). Sodium (24 g.) is added in ½ hour to an anhydrous solution of 110 g. of this hydrochloride in 500 ml. ether and 1 liter liquid ammonia. The residue after solvent removal is mixed with 700 ml. of 6 N HCl, and the solid product is separated and recrystallized successively from MeOH:H$_2$O and MeOH:EtOH to provide 2-[2-(n-decylamino)ethylamino]ethanethiol dihydrochloride, M.P. 253-254° (dec.). This product is mixed with hydrogen peroxide to provide the corresponding disulfide, which is then mixed with sodium bisulfite to produce S-(2-[2-(n-decylamino)ethylamino]ethyl)thiosulfuric acid.

*Example 12.—S-(2-[2-(6-hydroxyhexylamino)ethylamino]ethyl)thiosulfuric acid tartrate salt*

HO(CH$_2$)$_6$NHCH$_2$CH$_2$NHCH$_2$CH$_2$SSO$_3$H.C$_4$H$_6$O$_6$

Reaction of 1 - (2 - benzylthioethyl)aziridine with 6-amino-1-hexanol and acidification of the product gives 6-[2-(2-benzylthioethylamino)ethylamino] - 1 - hexanol dihydrochloride, M.P. 210–211° after recrystallization from EtOH. This product is treated with sodium in liquid ammonia, and the reaction product acidified to produce 6-[2-(2 - mercaptoethylamino)ethylamino]-1-hexanol dihydrochloride, M.P. 191–193°. This mercapto compound is treated with aqueous 3% hydrogen peroxide to produce 7,10,17,20-tetraazo - 13,14 - dithiahexacosane-1,26-diol, which is in turn treated with sodium bisulfite to provide S-(2-[2-(6-hydroxyhexylamino)ethylamino]ethyl)thiosulfuric acid, which is purified and converted to the tartrate salt following procedures as described in Example 10.

*Example 13.—S-[2-(2,3,4-trihydroxybutylamino)ethyl]thiosulfuric acid*

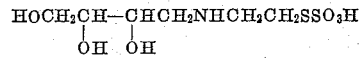

Reaction in benzene of chloroperbenzoic acid with 3-butene-1,2-diol (prepared from butadiene monoxide by hydrolysis), followed by water washing, provides 3,4-epoxy - 1,2 - butane diol, B.P. 80–81°/0.08 mm., $n_D^{25}$ 1.4677; $d_4^{25}$ 1.2369. This epoxide is added to 2-(benzylthio)-ethylamine in MeOH and the reaction product acidified with HCl to provide 4-[2-(benzylthio)ethylamino]-1,2,3-butanetriol hydrochloride, M.P. 80–85° after recrystallization from EtOH. This S-benzyl compound is treated with sodium in liquid ammonia and the reaction product acidified to provide 4-(2-mercaptoethylamino)1,2,3-butanetriol hydrochloride. This mercaptan compound is treated with H$_2$O$_2$ to provide 5,12-diaza-8,9-dithiahexadecan-1,2,3,14,15,16-hexol dihydrochloride. The stated disulfide is mixed with a 20:1 molar ratio of NaHSO₃ in the presence of H₂O₂ in water, to provide S-[2-(2,3,4-trihydroxybutylamino)ethyl]thiosulfuric acid, recovered by MeOH extraction. This product is passed through a strongly basic anion exchange resin (chloride ion form) to provide analytically pure S-[2-(2,3,4-trihydroxybutylamino)ethyl]thiosulfuric acid.

*Example 14.—S-[2-(2-[2-(2-hydroxyethoxy)ethylamino]-ethylamino)ethyl]thiosulfuric acid maleate salt*

HOCH₂CH₂OCH₂CH₂NHCH₂CH₂NHCH₂CH₂SSO₃H.
C₄H₄O₄

Reaction of 2-(2-aminoethoxy)ethanol with 1-(2-benzylthioethyl)aziridine in n-PrOH and acidification provides 2-(2-[2-(2-benzylthioethylamino)ethylamino]-ethoxy)ethanol dihydrochloride M.P. 167–8°. This S-benzyl compound is treated with sodium in liquid ammonia and the reaction product acidified with HCl to provide 2-(2 - [2-(2-mercaptoethylamino)ethylamino]ethoxy)ethanol dihydrochloride, M.P. 145–7°. This is treated with 3% H₂O₂ to provide 6,9,16,19-tetraaza - 3,22 - dioxa-12,13-dithiatetracosane-1,24-diol tetrahydrochloride, M.P. 232–233°. The disulfide is reacted with NaHSO₃ to provide crude S-[2-(2-[2-(2-hydroxyethoxy)ethylamino]ethylamino)ethyl]thiosulfuric acid. A methanol solution of the product is passed through a strongly basic anion exchange resin (chloride ion form) to provide purified S-[2-(2-[2-(2 - hydroxyethoxy)ethylamino]ethylamino)ethyl]thiosulfuric acid monohydrochloride. The hydrochloride is passed in water through a column of 100 g. of "Amberlite IR–45" a weakly basic anion exchange resin (hydroxyl form), using water for elution. The resulting oil is mixed with maleic acid in MeOH-EtOH solution. The resulting precipitate is S-[2-(2-[2-(2-hydroxyethoxy)ethylamino]-ethylamino)ethyl]thiosulfuric acid maleate salt, M.P. 105–110° (dec.).

*Example 15.—S-(2-[2,3-dihydroxy-2-(hydroxymethyl)-propylamino]-ethyl)thiosulfuric acid*

(HOCH₂)₂C(OH)CH₂NHCH₂CH₂SSO₃H

Diazomethane in ether is mixed with 1,3-dihydroxyacetone in methanol, with cooling, to give 2,3-epoxy-2-(hydroxymethyl) - 1 - propanol, B.P. 106–108°/0.07–0.12 mm., $n_D^{25}$ 1.4652. Addition of this epoxide to sodium S-(2-aminoethyl)thiosulfate in methanol produces an oil. An aqueous solution of 23 g. of the oil in 50 ml. of water is placed on a column of 100 g. of "Amberlite IRC–50," a weakly acidic cation exchange resin. The column is eluted with 450 ml. of water and the eluant concentrated to provide S-(2 - [2,3 - dihydroxy - 2 - (hydroxymethyl) propylamino]-ethyl)thiosulfuric acid, M.P. 147–8°.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. Substituted-alkyl aminoalkyl thiosulfuric acid compounds of the formula

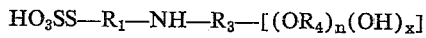

in which m and n are integers from 0 to 1 x is an integer of from 0 to 6 when m is 1 and from 1 to 6 when m is 0

M is H or an alkali metal each R″ is a saturated aliphatic hydrocarbon radical or an alkanoyl radical of the formula R₅CO—;

and each R is a saturated aliphatic hydrocarbon radical containing up to 18 carbon atoms or acid addition salts thereof.

2. Hydroxyalkyl aminoalkyl thiosulfuric acid inner salts of the formula

HO₃SS—R₁—NH—R₃—[(OR₄)ₙ(OH)ₓ]

in which each R is a saturated aliphatic hydrocarbon radical containing up to 18 carbon atoms n is an integer of from 0 to 1 and x is an integer of from 1 to 6.

3. The compounds of claim 2 in which n is 0 and x is 1.

4. S-[2-(3-hydroxypropylamino)ethyl]thiosulfuric acid.

5. The compounds of claim 2 in which x is an integer greater than 1.

6. dl - threo-S-(2-[2,3-dihydroxy-1-(hydroxymethyl)-propylamino]ethyl)thiosulfuric acid.

7. The compounds of claim 2 in which n is 1.

8. S-(2-[3-(2-hydroxyethoxy)-2-hydroxypropylamino]-ethyl)thiosulfuric acid.

9. A hydroxyalkyl aminoalkyl thiosulfuric acid alkali metal salt of the formula

M′O₃SS—R₁—NH—R₃[(OR₄)ₙ(OH)ₓ]

in which each R is a saturated aliphatic hydrocarbon radical containing up to 18 carbon atoms M′ is an alkali metal cation having an atomic weight below 40 n is an integer of from 0 to 1 and x is an integer of from 1 to 6.

10. Sodium S-[2-(2,3-dihydroxy-3-methylbutylamino)-ethyl]thiosulfate.

11. The amide of a hydroxyalkyl aminoalkyl thiosulfuric acid alkali metal salt of the formula

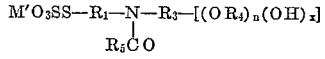

in which each R is saturated aliphatic hydrocarbon radical containing up to 18 carbon atoms M′ is an alkali metal cation having an atomic weight below 40 n is an integer of from 0 to 1 and x is an integer of from 1 to 6.

12. Sodium S - (2-[N-(2,3-dihydroxy-2-[hydroxymethyl]propyl)acetamido]ethyl)thiosulfate.

13. Acid addition salts of alkylaminoalkyl aminoalkyl thiosulfuric acid inner salts of the formula

HO₃SS—R₁—NH—R₂—NH—R₃ in which each R is saturated aliphatic hydrocarbon.

14. S - (2-[2-(n-decylamino)ethylamino]ethyl)-thiosulfuric acid hydrochloride.

15. Acid addition salts of oxyalkyl aminoalkyl aminoalkyl thiosulfuric acid inner salts of the formula

HO₃SS—R₁—NH—R₂—NH—R₃—[(OR₄)ₙ(OH)ₓ]

in which each R is saturated aliphatic hydrocarbon radical containing up to 18 carbon carbon atoms n is an integer from 0 to 1 x is an integer from 0 to 6 and at least one of n and x is at least 1.

16. S - [2 - [2-[(3-hydroxypropyl)amino]ethylamino) ethyl]thiosulfuric acid tartrate.

17. The non-toxic compounds of claim 1.

18. The non-toxic compounds of claim 1, in which the nitrogen atoms are H-substituted and beta to each of the sulfur-substituted carbon atom and an oxygen-substituted carbon atom.

19. The non-toxic inner salts of claim 2, in which the nitrogen atom is beta to each of the sulfur-substituted carbon atom and an oxygen-substituted carbon atom.

20. The non-toxic compounds of claim 3 in which the nitrogen atom is beta to each of the sulfur-substituted carbon atom and an oxygen-substituted carbon atom.

21. The non-toxic compounds of claim 5 in which the nitrogen atom is beta to each of the sulfur-substituted carbon atom and an oxygen-substituted carbon atom.

22. The non-toxic alkali metal salts of claim 9 in which the nitrogen atom is beta to each of the sulfur-substituted carbon atom and an oxygen-substituted carbon atom.

23. The non-toxic compounds of claim 13 in which a nitrogen atom is beta to each of the sulfur-substituted carbon atom and a nitrogen-substiuted carbon atom.

24. The non-toxic compounds of claim 5 in which a nitrogen atom is beta to each of the sulfur-substituted carbon atom and a nitrogen-substituted carbon atom.

References Cited

UNITED STATES PATENTS 2,934,552   4/1960   Gaertner ---------- 260—453

JOSEPH P. BRUST, *Primary Examiner.*

CHARLES B. PARKER, *Examiner.*